US007987158B2

(12) United States Patent
Boyd et al.

(10) Patent No.: US 7,987,158 B2
(45) Date of Patent: Jul. 26, 2011

(54) METHOD, SYSTEM AND ARTICLE OF MANUFACTURE FOR METADATA REPLICATION AND RESTORATION

(75) Inventors: Kenneth Wayne Boyd, Tucson, AZ (US); Kenneth Fairclough Day, III, Tucson, AZ (US); Mark Edward Dean, Tucson, AZ (US); John Jay Wolfgang, Winston-Salem, NC (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 11/054,976

(22) Filed: Feb. 9, 2005

(65) Prior Publication Data

US 2006/0179082 A1 Aug. 10, 2006

(51) Int. Cl.
*G06F 7/00* (2006.01)
*G06F 17/00* (2006.01)
(52) U.S. Cl. ......... 707/649; 707/640; 707/647; 707/650
(58) Field of Classification Search .......... None
See application file for complete search history.

(56) References Cited

U.S. PATENT DOCUMENTS

| 5,386,552 | A | * | 1/1995 | Garney | 714/10 |
|---|---|---|---|---|---|
| 5,446,904 | A | * | 8/1995 | Belt et al. | 713/323 |
| 5,485,608 | A | * | 1/1996 | Lomet et al. | 707/202 |
| 5,644,766 | A | * | 7/1997 | Coy et al. | 707/204 |
| 5,737,514 | A | * | 4/1998 | Stiffler | 714/13 |
| 5,864,657 | A | * | 1/1999 | Stiffler | 714/15 |
| 5,937,414 | A | * | 8/1999 | Souder et al. | 707/203 |
| 5,958,070 | A | * | 9/1999 | Stiffler | 714/13 |
| 6,105,148 | A | * | 8/2000 | Chung et al. | 714/16 |
| 6,205,558 | B1 | * | 3/2001 | Sobel | 714/15 |
| 6,240,416 | B1 | | 5/2001 | Immon et al. | |
| 6,553,391 | B1 | | 4/2003 | Goldring et al. | |
| 6,591,376 | B1 | * | 7/2003 | VanRooven et al. | 714/36 |
| 6,615,223 | B1 | * | 9/2003 | Shih et al. | 707/201 |
| 6,725,392 | B1 | | 4/2004 | Frey et al. | |
| 7,269,664 | B2 | * | 9/2007 | Hutsch et al. | 709/246 |
| 2003/0195864 | A1 | * | 10/2003 | Vishlitzky et al. | 707/1 |

FOREIGN PATENT DOCUMENTS

| JP | 55006623 | 1/1980 |
|---|---|---|
| JP | 5216697 | 8/1993 |

OTHER PUBLICATIONS

Information Materials for IDS, dated Jun. 3, 2011, 2 pgs.
Abstract for JP55006623, published Jan. 18, 1980, 1 pg.
Abstract for JP5216697, published Aug. 27, 1993, 1 pg.

* cited by examiner

*Primary Examiner* — Tim T. Vo
*Assistant Examiner* — Garrett Smith
(74) *Attorney, Agent, or Firm* — Rabindranath Dutta; Konrad Raynes & Victor LLP (57) ABSTRACT

Data and metadata are generated in a computational device, wherein the generated data is stored in a first physical storage device coupled to the computational device, and wherein the generated metadata is stored transiently in the computational device. The data and the metadata are replicated to a second physical storage device. The replicated data and the replicated metadata in the second physical storage device are used to recover from a failure of at least one of the computational device and the first physical storage device.

20 Claims, 6 Drawing Sheets

METHOD, SYSTEM AND ARTICLE OF MANUFACTURE FOR METADATA REPLICATION AND RESTORATION

BACKGROUND

1. Field

The disclosure relates to a method, system, and article of manufacture for replicating and restoring metadata.

2. Background

Information technology systems, including storage systems, may need protection from site disasters or outages. Furthermore, information technology systems may require features for data migration, data backup, or data duplication. Implementations for disaster or outage recovery, data migration, data backup, and data duplication may include mirroring or copying of data from one storage system to another. For example, in certain information technology systems, data may be replicated from a primary storage system to a secondary storage system. If the primary storage system is unavailable, then the replicated data in the secondary storage system may be used instead of the unavailable data in the primary storage system.

Recovery time objective is the time in which data availability should be restored. For example, if a trade execution program of a stock exchange should be up and running within thirty seconds of the primary storage system being unavailable, then the recovery time objective for the trade execution program is thirty seconds.

Recovery point objective is the point in time to which data must be restored in order to resume processing. For example, if a trade execution program of a stock exchange fails then certain data may be lost if all data is not synchronously backed up to the secondary storage. The recovery point objective is the point in time to which the trade execution program and any lost data should be restored. The recovery time objective is a period of time, while the recovery point objective is a point in time.

SUMMARY OF THE DESCRIBED EMBODIMENTS

Provided are a method, system, and article of manufacture, wherein data and metadata are generated in a computational device, wherein the generated data is stored in a first physical storage device coupled to the computational device, and wherein the generated metadata is stored transiently in the computational device. The data and the metadata are replicated to a second physical storage device. The replicated data and the replicated metadata in the second physical storage device are used to recover from a failure of at least one of the computational device and the first physical storage device.

In certain embodiments, the computational device is a first computational device, wherein the data and the metadata are generated by a first application that executes in the first computational device, and wherein the recovering from the failure further comprises restoring the replicated metadata to a second computational device and allowing a second application that is a copy of the first application to use the replicated data in the second physical storage device, wherein the second application is capable of executing in the second computational device. The second application is executed from a point of failure of the first application by using the restored metadata and the replicated data.

In certain additional embodiments, the replicating of the data and the metadata to the second physical storage device further comprises copying the data from the first physical storage device to the second physical storage device, and copying the metadata from memory of the computational device to the second physical storage device.

In additional embodiments, the metadata comprises messages for communication from the computational device to another computational device. In yet additional embodiments, the metadata comprises state information of an executing application that generates the data and the metadata.

In further embodiments, the metadata is not stored in the first physical storage device.

In yet further embodiments, a first time period for recovering from the failure is of a lesser duration in a first system that replicates the data and the metadata in comparison to a second time period for recovering from the failure in a second system that replicates the data but not the metadata In still further embodiments, the metadata is a first metadata that is selected from a second metadata generated by the computational device, wherein an amount of the first metadata selected from the second metadata is based on a recovery time objective.

In additional embodiments, the data and the metadata are replicated to the second physical storage device in a consistent manner.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain applications, such as, database applications, may have metadata transiently stored in the cache or in internal memory. Although the majority of the data for an application may reside in a physical storage device, not all of the data is kept in the physical storage at all times. Even if the physical storage device is replicated for data protection, in the case of a system failure the metadata that is transiently stored in the cache or in the internal memory may be lost. As a result, recovery of a consistent version of a failed application may not be possible and may take a substantial amount of time to accomplish, where the substantial amount of time may be greater than a recovery time objective.

It certain situations, the recovery time objective may be important and applications that failed may have to start running within the period of time defined by the recovery time objective. Certain embodiments replicate the metadata transiently stored in the cache and internal memory so as to reduce the recovery time when compared to the situation where the transiently stored metadata is not replicated. For example, in certain embodiments in which a failure of a database occurs, the recovery of the database may be much faster since all the data and metadata necessary to recover a consistent version of the database may be replicated.

Figure 1:
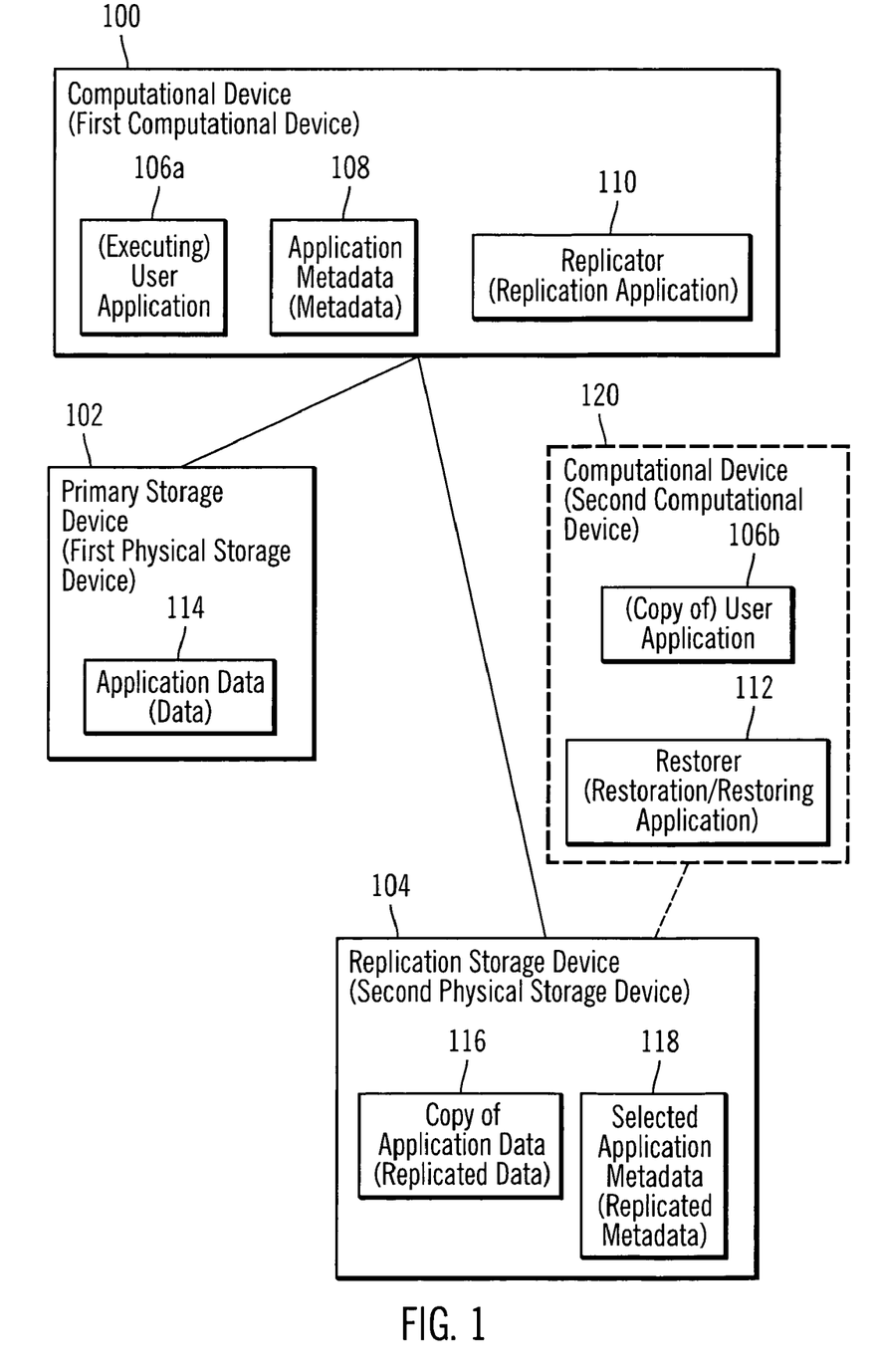
FIG. 1 illustrates a block diagram of a computing environment in accordance with certain embodiments.

FIG. 1 illustrates a block diagram of a computing environment in accordance with certain embodiments. A computational device 100 is coupled to a primary storage device 102 and a replication storage device 104. The computational device 100 may be any suitable device including those presently known in the art, such as, a personal computer, a workstation, a server, a mainframe, a hand held computer, a palm top computer, a telephony device, a network appliance, a blade computer, a storage server, etc. The primary storage device 102 and the replication storage device 104 may include any suitable data repository system including those presently known in the art, such as, a Direct Access Storage Device (DASD), one or more RAID ranks, Just a bunch of disks (JBOD), etc. In certain embodiments, the primary storage device 102 and the replication storage device 104 may be storage controllers.

While FIG. 1 shows the computational device 100 as being directly coupled to the primary storage device 102 and the replication storage device 104, in other embodiments the computational device 100, the primary storage device 102, and the replication storage device 104 may coupled over a suitable network including those presently known in the art, such as, a Storage area network (SAN), a Local area network (LAN), the Internet, an intranet, a Wide area network (WAN), a wireless network, etc.

The computational device 100 may include an executing user application 106a, application metadata 108 and a replicator 110. The user application 106a is any suitable application including those presently known in the art, such as, a database application, a spreadsheet application, a word processing application, etc. In certain embodiments, the user application 106a executes in the computational device 100. The application metadata 108 is metadata associated with the executing application 106a. Metadata is data about data. For example, when the user application 106a executes in the computational device 100, application data 114 associated with the user application 106a may be stored in the primary storage device 102. The application metadata 108 may be metadata for the application data 114, where the application metadata 108 is stored transiently in the computational device 100 while the user application 106a executes in the computational device 100. For example, the user application 106a may be a database application, the application data 114 may be the database corresponding to the database application, and the application metadata 108 may be the metadata corresponding to the executing database application and the database.

The replicator 110 may be any suitable application, implemented in hardware, software, or firmware, where the replicator 110 copies the application data 114 to the replication storage device 104. In certain embodiments, the copied application data is stored in the data element "the copy of application data" 116. Additionally, the replicator 110 also copies selected portions of the application metadata 108 to the replication storage device 104 for storage in the data element "selected application metadata" 118.

In certain embodiments, in which the computational device 100 is a first computational device, a second computational device 120 may be coupled to the replication storage device 104. In certain embodiments, a restorer 112 may be present in the second computational device, where the restorer 112 may be any suitable application, implemented in hardware, software, or firmware. In case of a failure of the computational device 100, a system comprising the second computational device 120 and the replication storage device 104 may recover from the failure by using the copy of the application data 116 and the copy of the application metadata 118 to restart a user application 106b that is a copy of the user application 106a from the point at which the user application 106a failed.

The restorer 112 may in association with a higher level application (not shown) start the user application 106b within a recovery point objective by using the selected application metadata 118 that is present in the replication storage device 104. Since the user application 106b is a copy of the user application 106a, restarting the user application 106b may in effect continue the execution of the failed user application 106a. Therefore, in case of a failure of the first computational device 100 the restorer 112 restores the selected application metadata 118 to the second computational device 120. In certain embodiments, a higher level application (not shown), in association with the restorer 112, may continue the execution of the user application 106a by starting the user application 106b that is a copy of the user application 106a with the selected application metadata 118.

Therefore, FIG. 1 illustrates an embodiment in which the replicator 110 in a first computational device 100 replicates the application metadata 108 and the application data 114 corresponding to an executing user application 106a in a replication storage device 104. In case of a failure of the first computational device 100, the restorer 112 in the second computational device 120 in association with a higher level application may use the application metadata stored in the selected application metadata 118, and the replicated application data stored in the copy of application data 116, to restart the user application 106b within a recovery point objective of the failure of the user application 106a, where the user application 106b is a copy of the user application 106a.

Figure 2:
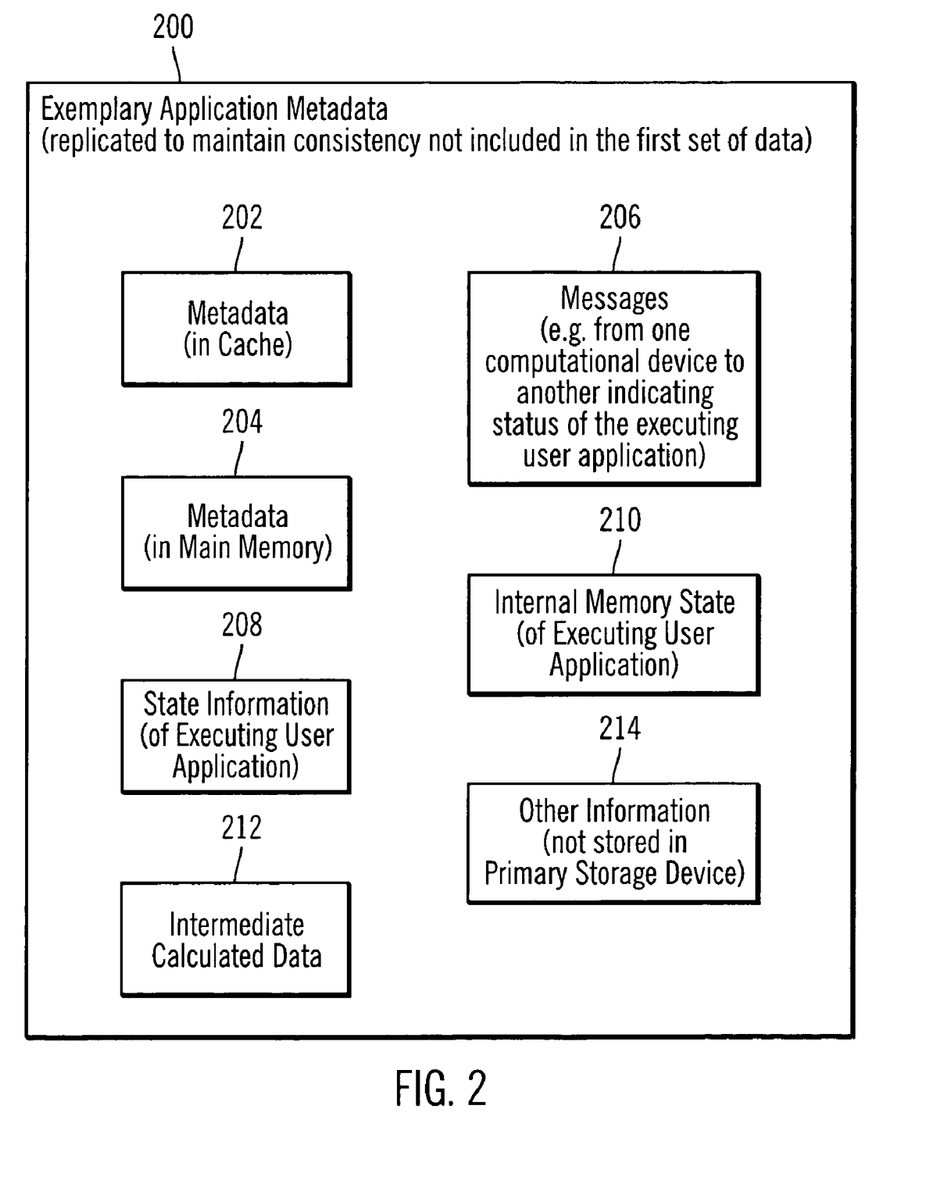
FIG. 2 illustrates a block diagram that shows exemplary application metadata, in accordance with certain embodiments.

FIG. 2 illustrates a block diagram that shows exemplary application metadata 200 implemented in the computational device 100, in accordance with certain embodiments. In certain embodiments, the exemplary application metadata 200 may correspond to the application metadata 108 of FIG. 1.

The exemplary application metadata 200 may comprise metadata 202 in cache, metadata 204 in main memory, messages 206, state information 208 of executing user application 106a, internal memory state 210 of executing user application 106a, intermediate calculated data 212, and other information 214 that is not stored in the primary storage device 102. The elements in FIG. 2 that comprise the exemplary application metadata 200 are exemplary, and information present in one exemplary component may be present in another exemplary component. For example, portions of the metadata 204 in main memory may also be present in the metadata 202 in the cache. The components of the exemplary application metadata 200 could also be categorized differently from that shown in FIG. 2.

Parts of the exemplary application metadata 200 may be stored in a cache or main memory of the computational device 100, where the parts stored in the cache or main memory may be transient, i.e., temporary, and not saved in the primary storage device 102. For example, in certain embodiments, the metadata 202 in the cache of the computational device and the metadata 204 in main memory of the computational device 100 may not be stored in the primary storage device 102. The metadata 202, 204 may be generated during the execution of the user application 106a.

During the execution of the user application 106a, certain messages 206 may be generated. For example, a message that indicates the status of the executing user application 106a may be generated in computational device 100 for sending to another computational device. Such generated messages 206 may be stored transiently in the computational device 100 and may not be stored in the primary storage device 102.

In certain embodiments, state information 208 of the executing user application 106a and the internal memory state 210 of the executing user application 106a may be stored transiently in the computational device 100. In certain additional embodiments, a series of calculations may be performed by the executing user application 106a and intermediate values generated during the series of calculations may be stored transiently in the intermediate calculated data 212 rather than in the primary storage device 102. In certain embodiments, only the final result of the series of calculations may be stored in the primary storage device 102. In certain embodiments, other information 214 not stored in the primary storage device 102, i.e., information not stored in the application data 114, may also comprise the exemplary application metadata 200.

FIG. 2 illustrates an embodiment in which the exemplary application metadata 200 may be stored transiently, i.e., temporarily, in a plurality of forms in the computational device 100, where the exemplary application metadata 200 is not stored in the primary storage device 102 during the execution of the user application 106a.

Figure 3:
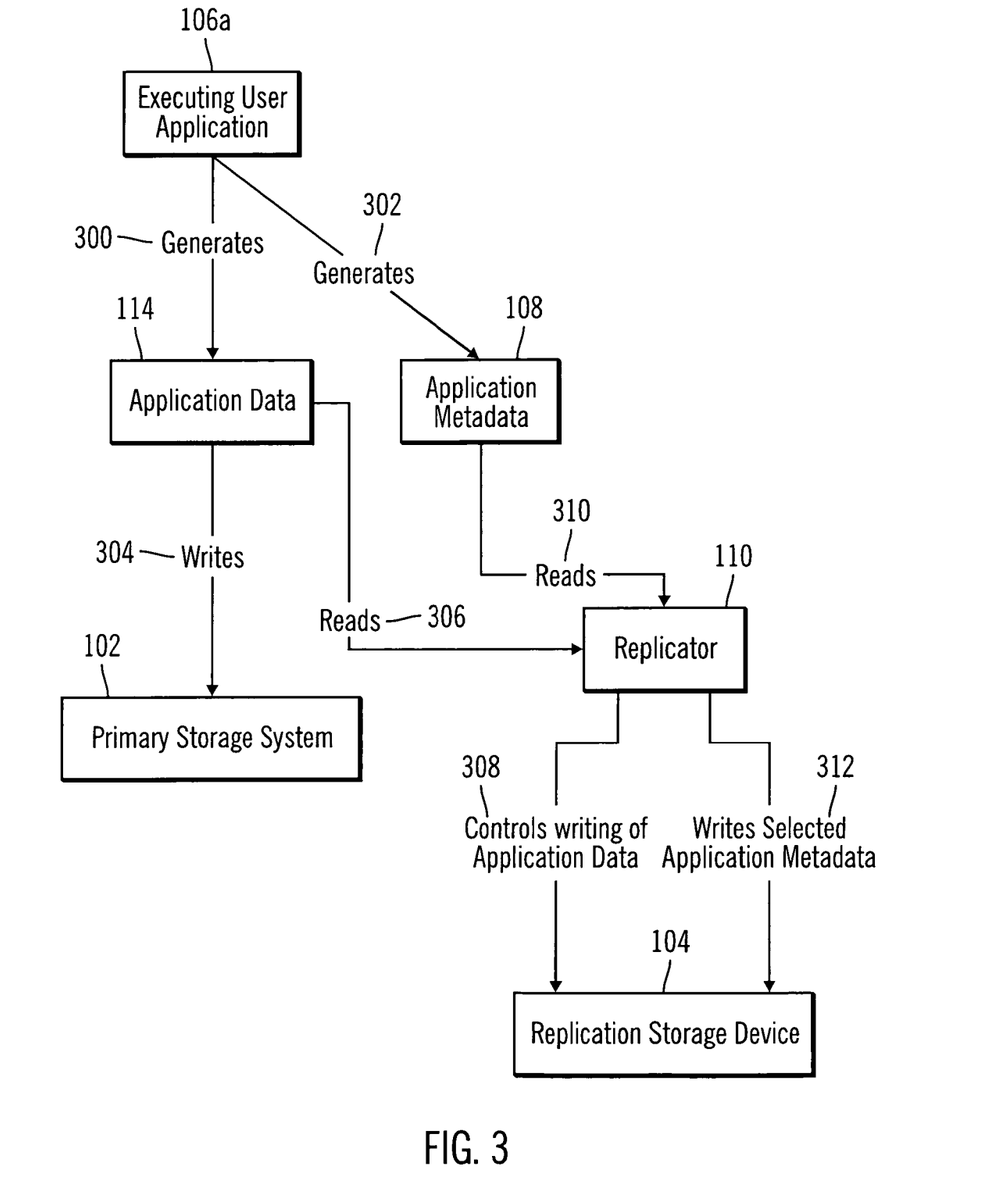
FIG. 3 illustrates a block diagram for replicating metadata, in accordance with certain embodiments.

FIG. 3 illustrates a block diagram for replicating the application metadata 108, in accordance with certain embodiments.

The executing user application 106a generates (reference numeral 300) the application data 114 and may also generate (reference numeral 302) the application metadata 108. The application data 114 may be written (reference numeral 304) to the primary storage device 102.

In certain embodiments, the replicator 110 reads (reference numeral 306) the application data 114 and controls (reference numeral 308) the writing of the application data 114 to the replication storage device 104 to generate the copy of the application data 116. The replicator 110 may read the application data 114 as the application data 114 is being generated by the user application 106a, or may read the application data 114 from the primary storage system 102. In certain alternative embodiments, the copying of the application data 114 from the primary storage device 102 to the replication storage device 104 may be performed by an application different from the replicator 110.

In certain embodiments, the replicator 110 reads (reference numeral 310) the application metadata 108 from the computational device 100 and writes (reference numeral 312) selected parts of the application metadata 108 to the replication storage device 104 in the selected application metadata 118.

The selected application metadata 118 in combination with the copy of the application data 116 may be adequate for restarting the executing user application 106a within the recovery time objective in the event of a failure in either the computational device 100 or the primary storage device 102. In certain embodiments, the restorer 112 may in association with a higher level application start the user application 106b (user application 106b is a copy of the user application 106a) in the second computational device 120 in the event of a failure of the first computational device 100. In certain embodiments, if a first recovery time objective is of a smaller duration of time than a second recovery time objective, then a greater amount of application metadata 108 may have to be selected for storage in the selected application metadata 118. The application data 114 and the application metadata 108 are replicated in a consistent manner to the replication storage device 104 in certain embodiments. In case the replication is performed asynchronously, consistent replication may be necessary in certain embodiments.

FIG. 3 illustrates an embodiment in which the replicator 110 stores the application data 114 and selected parts of the application metadata 108 in the replication storage device 104.

Figure 4:
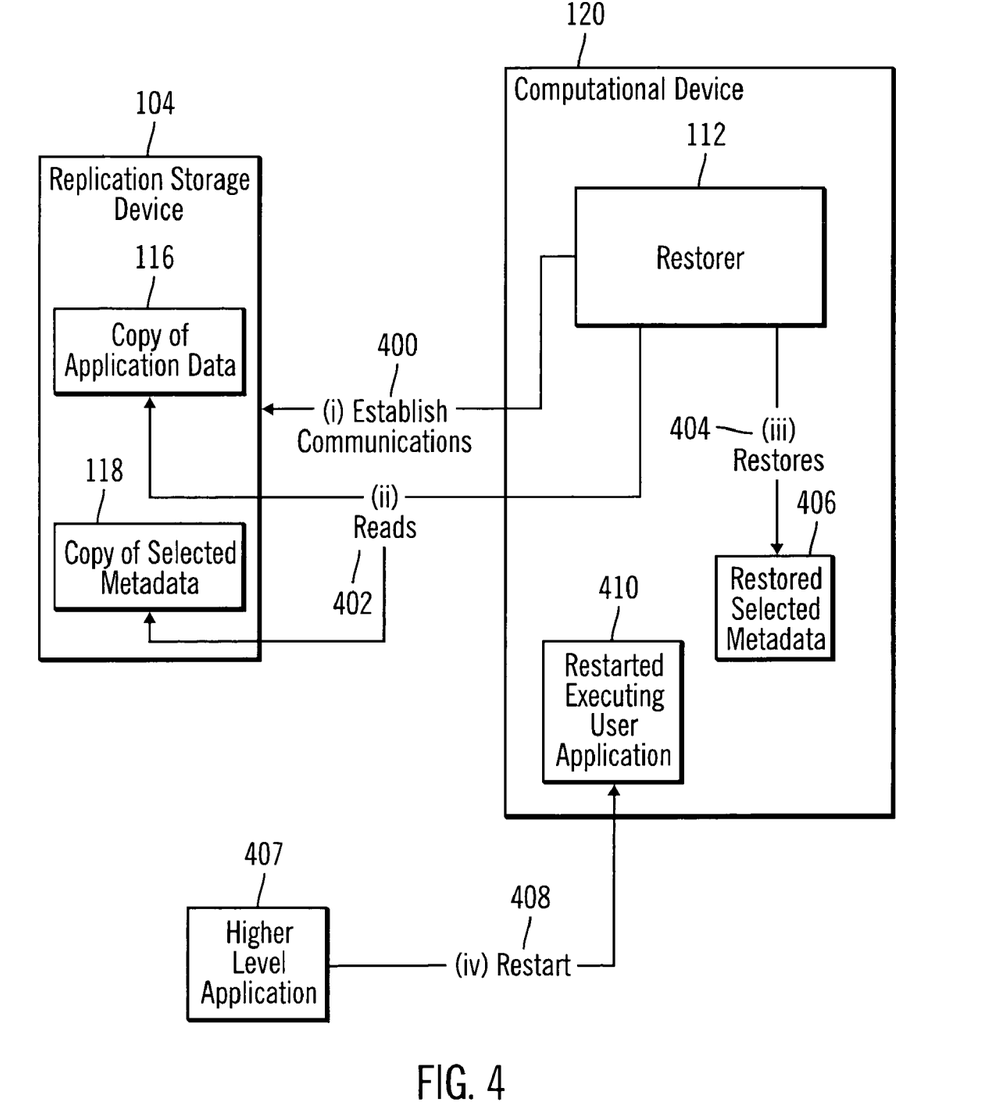
FIG. 4 illustrates a block diagram for restoring metadata, in accordance with certain embodiments.

FIG. 4 illustrates a block diagram for continuing the execution of the user application 106a within a recovery time objective by restoring the application metadata 108, in accordance with certain embodiments. In certain embodiments, the application metadata 108 is restored to the second computational device 120 by the restorer 112 in the event of a failure of the first computational device 100.

In the event of an unavailability of the application data 114 stored in the primary storage device 102 or a failure of the user application 106a, the restorer 112, i.e., the restoration application, establishes communications (reference numeral 400) with the replication storage device 104. The restorer 112 reads (reference numeral 402) the copy of the application data 116 and the copy of selected metadata 118 from the replication storage device 104. The copy of the application data 116 and the copy of selected metadata 118 may have been stored by the replicator 110 prior to the unavailability of the application data 114 or the failure of the user application 106a.

The restorer 112 restores (reference numeral 404) the selected metadata 118 to a computational device, such as, the second computational device 120. For example, the restored selected metadata 406 may be stored in the second computational device 120. A higher level application 407 that may be located inside or outside of the second computational device 102 may restart (reference numeral 408) user application 106b (indicated as the executing user application 410 in FIG. 4). The restarted executing user application 410 executes with the restored selected metadata 406 and the copy of the application data 116. The restoration of the selected application metadata 118 may allow the restarted executing user application 410 (may correspond to the user application 106a) to be up and running within a smaller waiting period when compared to no restoration of the selected metadata 118.

Therefore, FIG. 4 illustrates certain embodiments in which the restoration of the selected metadata 118 allows the restored executing application 410 to be up and running within a time period less than a recovery time objective. While FIG. 4 shows the restorer 112 in the computational device 120, in certain alternative embodiments the restorer 112 may also be present in the computational device 100.

Figure 5:
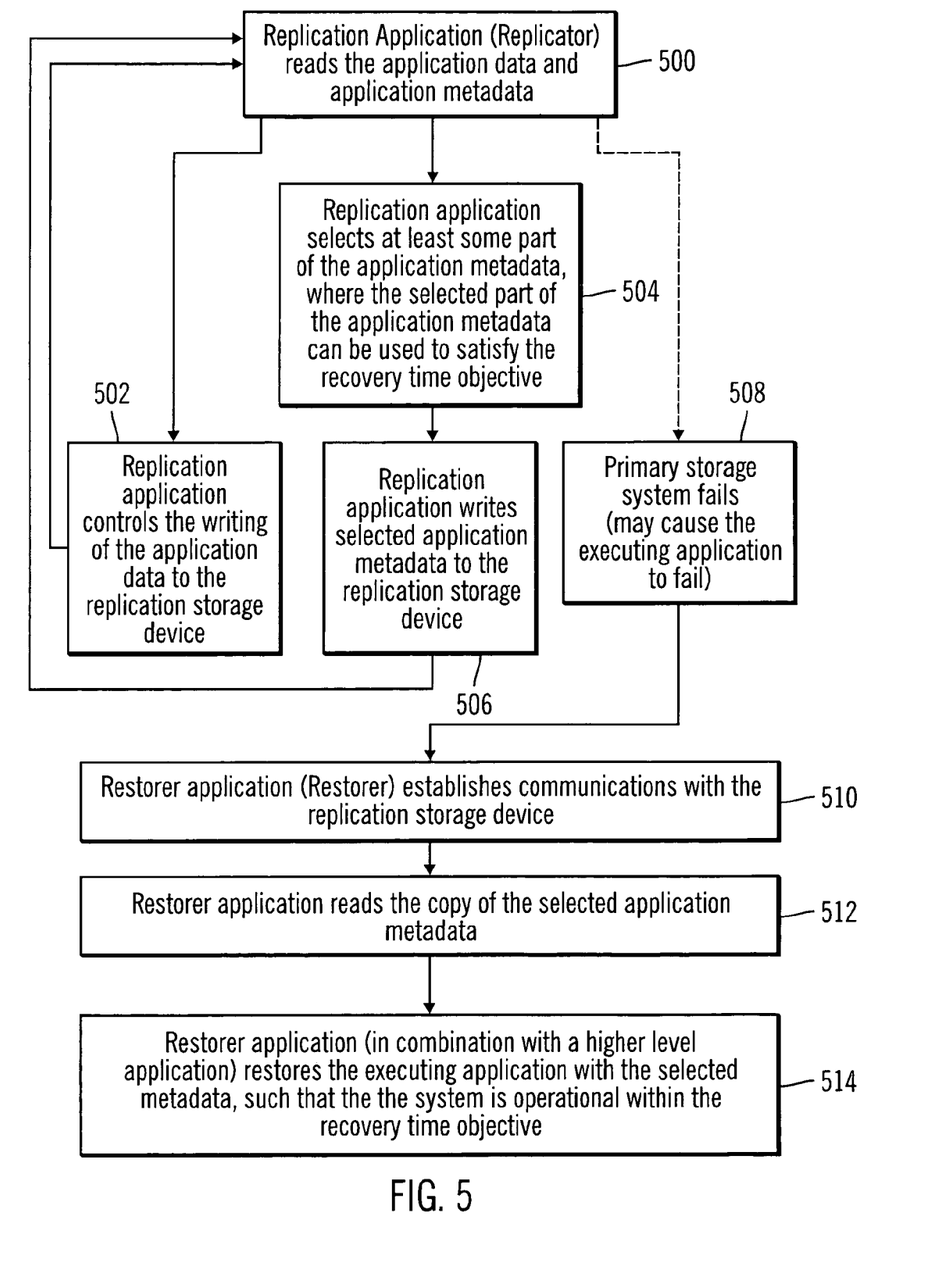
FIG. 5 illustrates operations for replicating and restoring metadata, in accordance with certain embodiments.

FIG. 5 illustrates operations for replicating and restoring metadata, in accordance with certain embodiments. In certain embodiments, the replicating is implemented in the first computational device 100 and the restoring is implemented in the second computational device 120.

Control starts at block 500, where a replication application, such as, the replicator 110, reads the application data 114 and the application metadata 108. The application data 114 and the application metadata 108 may have been generated by the execution of the user application 106a.

The replication application 110 controls (at block 502) the writing of the application data 114 to the replication storage device 104. In parallel, the replication application selects (at block 504) at least some part of the application metadata 108, where the selected part of the application metadata can be used to satisfy the recovery time objective in case of an unavailability of the application data 114 stored in the primary storage device 102 or in case of a failure of the user application 106a.

Subsequent to the selecting (at block 504) of the at least some part of the application metadata, the replication application 110 writes (at block 506) the selected application metadata 118 to the replication storage device 104. Control returns to block 500 from blocks 502, 506 and the replication application 110 reads (at block 500) further generated application data 114 and application metadata 108. Therefore, the replication application 110 may repeatedly keep on updating the replication storage device 104 as the executing user application 106a causes the generation of updated application data 114 and updated application metadata 108.

Control may also proceed from block 500 to block 508, where the primary storage system 102 fails to make the application data 114 available to the executing user application 106a or the executing user application 106a fails. The unavailability of the application data 114 to the executing user application 106a may be for a plurality of reasons including failure of disks or other storage units in the primary storage device 102. The unavailability of the application data 114 from the primary storage device 102 may cause the executing user application 106a not to make further progress in execution. The user application 106a may also fail because of a failure of the first computational device 100.

A restoring application, such as, the restorer 112, establishes (at block 510) communications with the replication storage device 104. The restoring application 112 reads (at block 512) the copy of the selected application metadata 118.

The restoring application 112 in combination with the higher level application 407 restores (at block 514) the executing user application 106a (via the copy of the user application 106a, i.e., via the user application 106b) to continue execution with the restored selected metadata 408 and the copy of application data 116. The restoration of the selected metadata 408 causes the user application 106a to continue execution with a lesser time period for waiting in comparison to situations where no application metadata corresponding to the user application 106a is replicated to the replication storage device 104. The user application 106a (i.e., 106b) that continues execution already expects the application data to be in the replication storage device 104 so the restoring application 112 does not have to read the copy of application data 116.

Figure 6:
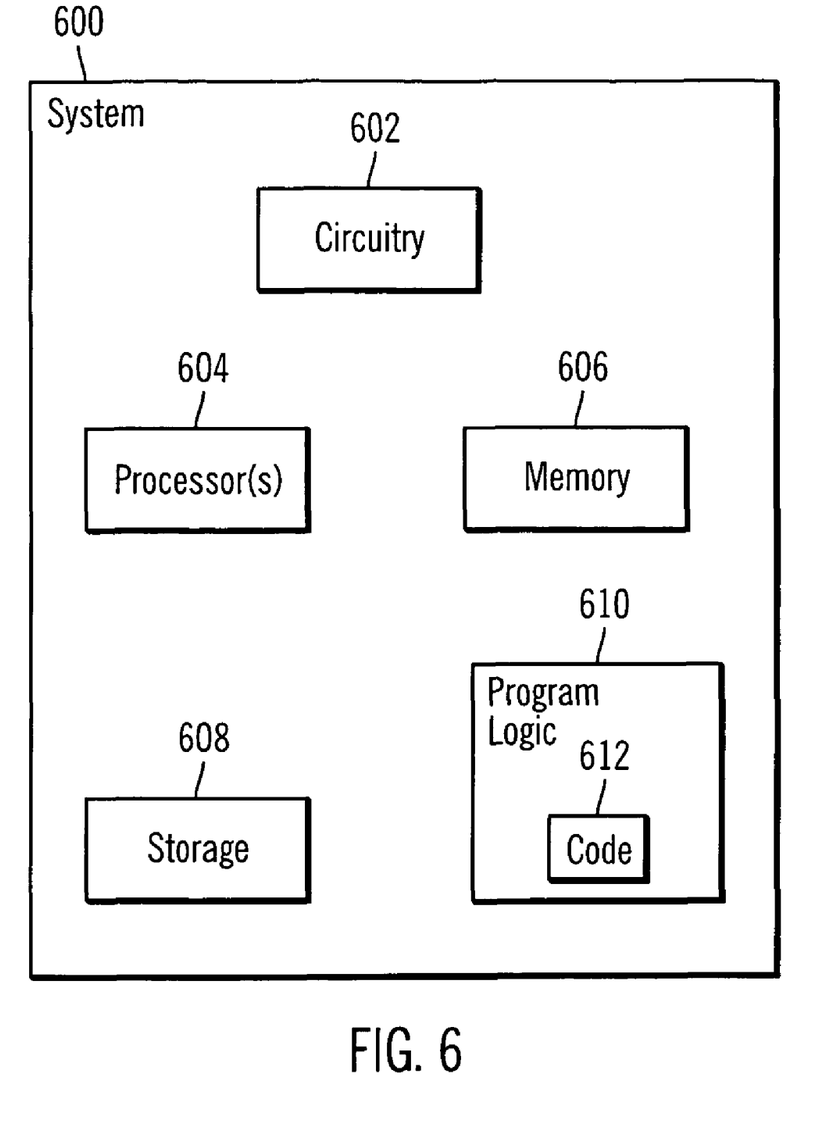
FIG. 6 illustrates a system in which certain embodiments are implemented.

Therefore, FIG. 6 illustrates certain embodiments in which an application can replicate application metadata 108 to a replication storage device 104. In the event of a system failure, the replicated application metadata can be used to recover from a failure in a lesser period of time in comparison to a situation where no replication is performed of the application metadata.

In certain embodiments, the restorer 112 and the replicator 110 may be on same or different computational devices. For example, in certain embodiments the replicator 110 may be present in the first computational device 100 and the restorer 112 may be present in the second computational device 120 as shown in FIG. 1. In such a case, the restorer 112 would restore the replicated metadata 118 to the second computational device 120 for recovery from a failure.

In certain embodiments, the replicator 110 and the restorer 112 may be implemented by creating a container class that holds all the relevant metadata that is replicated. This container class may be enhanced to automatically replicate all metadata in to the replication storage device 104 in the event of a data update. In certain other embodiments, a user can select which parts of the metadata to replicate, and the corresponding metadata classes may be replicated.

Alternatively, in certain embodiments an application programming interface can be implemented for reading and writing metadata to internal memory. The application programming interface may replicate all necessary metadata to the replication storage device 104 whenever a data update is carried out. In certain implements, a ramdisk in the internal memory of the computational device 100 may be created to store all the metadata. A ramdisk is a portion of memory that is allocated to be used as a partition, i.e., the portion of memory comprising the ramdisk can store data in a manner similar to a hard disk drive. The access to this ramdisk memory may be via a ramdisk device driver that also synchronously replicates all writes to ramdisk to the replication storage device 104.

In certain embodiments, to provide for a faster recovery from a failure, a high-speed data link is provided to the replication storage device 104 and the replication storage device 104 is kept proximate to the second computational device 120 that continues with the execution of the user application 106a.

In certain embodiments, the replication storage device 104 combines both the metadata and disk data updates into a single consistency group. As a result, the replicated data and the replicated metadata may include all the necessary information to enable a recovery of a system within a recovery time objective. The data and the metadata are replicated in a consistent manner to the replication storage device 104, especially for asynchronous replication schemes.

Certain embodiments allow the replication of entities other than just physical storage in a data replication solution. Products in the data replication industry that are capable of replicating physical disk volumes to a secondary storage site may have a low recovery point objective of the replicated data but may not have means to control the recovery time objective. Certain embodiments provide the capability to replicate non-physical storage along with the physical storage. For instance, replication of a server's internal memory or cache, or data transfers that occur over a data line between two servers are replicated. Certain embodiments also maintain data consistency between the physical volumes and nonphysical volumes.

Certain embodiments provide a replication solution that is able to provide both replicated physical storage and replicated internal cache memory or state with the expectation that recovery from the replication storage device would take less time as a result of having additional replicated metadata. The recovery time objective of the data replication solution can therefore be attained in certain embodiments.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

FIG. 6 illustrates a block diagram of a system 600 in which certain embodiments may be implemented. In certain embodiments, the computational devices 100, 120 may be implemented in accordance with the system 600. The system 600 may include a circuitry 602 that may in certain embodiments include a processor 604. The system 600 may also include a memory 606 (e.g., a volatile memory device), and storage 608. Certain elements of the system 600 may or may not be found in the computational devices 100, 120. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608.

Certain embodiments may be directed to a method for deploying computing instruction by a person or automated processing integrating computer-readable code into a computing system, wherein the code in combination with the computing system is enabled to perform the operations of the described embodiments.

At least certain of the operations of FIG. 5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    creating a container class to implement a replication application and a restoration application, wherein the replication application executes in a first computational device, and wherein the restoration application executes in a second computational device, and wherein the container class holds all metadata that is to be replicated;
    generating data and first metadata, by an executing first application, in the first computational device, wherein the generated data is stored in a first physical storage device coupled to the first computational device, storing the generated first metadata transiently in the first computational device in a ramdisk of the first computational device, wherein the ramdisk is a portion of an internal memory of the first computational device, allocating the ramdisk as a partition, and accessing the ramdisk via a ramdisk device driver, wherein to generate the first metadata the executing first application performs: (a) storing state information of the executing first application in the first metadata, (b) storing messages for communication from the first computational device to another computational device in the first metadata, (c) storing internal memory state of the executing first application in the first metadata, (d) storing intermediate calculated data that transiently stores intermediate values generated by a series of calculations performed by the executing first application in the first metadata, and storing parts of the first metadata in the first computational device transiently and not saving the parts of the first metadata in the first physical storage device;
    replicating, by the replication application that executes in the first computational device, the data and at least part of the first metadata to a second physical storage device by:
        (i) copying the data from the first physical storage device to the second physical storage device; and
        (ii) selecting second metadata from the first metadata based on a recovery time objective that defines a period of time in which to recover from any failure of the executing first application on the first computational device, wherein the second metadata is part of the first metadata and smaller in amount than the first metadata, and copying the second metadata from the ramdisk of the first computational device to the second physical storage device by synchronously replicating via the ramdisk device driver all writes to the ramdisk to the second physical storage device, wherein the second physical storage device combines both the data and the second metadata into a single consistency group and the data and the second metadata are replicated in a consistent manner to the second physical storage device; and
    recovering from a failure of the executing first application within the period of time defined by the recovery time objective by:
        (i) restoring, by the restoration application that executes in the second computational device, the replicated second metadata to the second computational device, wherein the second computational device is different from the first computational device;
        (ii) allowing a second application that is a copy of the first application that was executing in the first computational device to use the replicated data in the second physical storage device; and
        (iii) executing the second application at the second computational device from a point of failure of the first application by using the restored second metadata comprising the state information of the executing first application and the replicated data, wherein the second application starts executing within the period of time defined by the recovery time objective.

2. The method of claim 1, wherein the metadata is not stored in the first physical storage device.

3. The method of claim 1, wherein a first time period for recovering from the failure is of a lesser duration in a first system that replicates the data and the metadata in comparison to a second time period for recovering from the failure in a second system that replicates the data but not the metadata.

4. The method of claim 1, wherein the data and the metadata are replicated to the second physical storage device in a consistent manner.

5. A method for deploying computing infrastructure, comprising integrating computer-readable code into a computing system, wherein the code in combination with the computing system is capable of performing:
creating a container class to implement a replication application and a restoration application, wherein the replication application executes in a first computational device, and wherein the restoration application executes in a second computational device, and wherein the container class holds all metadata that is to be replicated;
generating data and first metadata, by an executing first application, in the first computational device, wherein the generated data is stored in a first physical storage device coupled to the first computational device, storing the generated first metadata transiently in the first computational device in a ramdisk of the first computational device, wherein the ramdisk is a portion of an internal memory of the first computational device, allocating the ramdisk as a partition, and accessing the ramdisk via a ramdisk device driver, wherein to generate the first metadata the executing first application performs: (a) storing state information of the executing first application in the first metadata, (b) storing messages for communication from the first computational device to another computational device in the first metadata, (c) storing internal memory state of the executing first application in the first metadata, (d) storing intermediate calculated data that transiently stores intermediate values generated by a series of calculations performed by the executing first application in the first metadata, and storing parts of the first metadata in the first computational device transiently and not saving the parts of the first metadata in the first physical storage device;
replicating, by the replication application that executes in the first computational device, the data and at least part of the first metadata to a second physical storage device by:
(i) copying the data from the first physical storage device to the second physical storage device; and
(ii) selecting second metadata from the first metadata based on a recovery time objective that defines a period of time in which to recover from any failure of the executing first application on the first computational device, wherein the second metadata is part of the first metadata and smaller in amount than the first metadata, and copying the second metadata from the ramdisk of the first computational device to the second physical storage device by synchronously replicating via the ramdisk device driver all writes to the ramdisk to the second physical storage device, wherein the second physical storage device combines both the data and the second metadata into a single consistency group and the data and the second metadata are replicated in a consistent manner to the second physical storage device; and recovering from a failure of the executing first application within the period of time defined by the recovery time objective by:
(i) restoring, by the restoration application that executes in the second computational device, the replicated second metadata to the second computational device, wherein the second computational device is different from the first computational device;
(ii) allowing a second application that is a copy of the first application that was executing in the first computational device to use the replicated data in the second physical storage device; and
(iii) executing the second application at the second computational device from a point of failure of the first application by using the restored second metadata comprising the state information of the executing first application and the replicated data, wherein the second application starts executing within the period of time defined by the recovery time objective.

6. The method for deploying computing infrastructure of claim 5, wherein the metadata is not stored in the first physical storage device.

7. The method for deploying computing infrastructure of claim 5, wherein a first time period for recovering from the failure is of a lesser duration in a first system that replicates the data and the metadata in comparison to a second time period for recovering from the failure in a second system that replicates the data but not the metadata.

8. The method for deploying computing infrastructure of claim 5, wherein the data and the metadata are replicated to the second physical storage device in a consistent manner.

9. The method of deploying computing infrastructure of claim 5, wherein:
(i) the first computational device includes: (a) a replication application; and (b) a user application that is the first application; and
(ii) the second computational device includes: (a) a restoration application; and (b) a copy of the user application, wherein the copy of the user application is the second application.

10. The method of claim 1, wherein:
(i) the first computational device includes: (a) a replication application; and (b) a user application that is the first application; and
(ii) the second computational device includes: (a) a restoration application; and (b) a copy of the user application, wherein the copy of the user application is the second application.

11. A system comprising:
a memory; and
a processor coupled to the memory, wherein the processor performs operations, the operations comprising:
creating a container class to implement a replication application and a restoration application, wherein the replication application executes in a first computational device, and wherein the restoration application executes in a second computational device, and wherein the container class holds all metadata that is to be replicated;
generating data and first metadata, by an executing first application, in the first computational device, wherein the generated data is stored in a first physical storage device coupled to the first computational device, storing the generated first metadata transiently in the first computational device in a ramdisk of the first computational device, wherein the ramdisk is a portion of an internal memory of the first computational device, allocating the ramdisk as a partition, and accessing the ramdisk via a ramdisk device driver, wherein to generate the first metadata the executing first application performs: (a) storing state information of the executing first application in the first metadata, (b) storing messages for communication from the first computational device to another computational device in the first metadata, (c) storing internal memory state of the executing first application in the first metadata, (d) storing intermediate calculated data that transiently stores intermediate values generated by a series of calculations performed by the executing first application in the first metadata, and storing parts of the first metadata in the first computational device transiently and not saving the parts of the first metadata in the first physical storage device;

replicating, by the replication application that executes in the first computational device, the data and at least part of the first metadata to a second physical storage device by:
- (i) copying the data from the first physical storage device to the second physical storage device; and
- (ii) selecting second metadata from the first metadata based on a recovery time objective that defines a period of time in which to recover from any failure of the executing first application on the first computational device, wherein the second metadata is part of the first metadata and smaller in amount than the first metadata, and copying the second metadata from the ramdisk of the first computational device to the second physical storage device by synchronously replicating via the ramdisk device driver all writes to the ramdisk to the second physical storage device, wherein the second physical storage device combines both the data and the second metadata into a single consistency group and the data and the second metadata are replicated in a consistent manner to the second physical storage device; and recovering from a failure of the executing first application within the period of time defined by the recovery time objective by:
- (i) restoring, by the restoration application that executes in the second computational device, the replicated second metadata to the second computational device, wherein the second computational device is different from the first computational device;
- (ii) allowing a second application that is a copy of the first application that was executing in the first computational device to use the replicated data in the second physical storage device; and
- (iii) executing the second application at the second computational device from a point of failure of the first application by using the restored second metadata comprising the state information of the executing first application and the replicated data, wherein the second application starts executing within the period of time defined by the recovery time objective.

12. The system of claim 11, wherein the metadata is not stored in the first physical storage device.

13. The system of claim 11, wherein a first time period for recovering from the failure is of a lesser duration in a first system that replicates the data and the metadata in comparison to a second time period for recovering from the failure in a second system that replicates the data but not the metadata.

14. The system of claim 11, wherein the data and the metadata are replicated to the second physical storage device in a consistent manner.

15. The system of claim 11, wherein:
- (i) the first computational device includes: (a) a replication application; and (b) a user application that is the first application; and
- (ii) the second computational device includes: (a) a restoration application; and (b) a copy of the user application, wherein the copy of the user application is the second application.

16. A computer readable storage medium, wherein code stored in the computer readable storage medium when executed by a processor causes operations, the operations comprising:

creating a container class to implement a replication application and a restoration application, wherein the replication application executes in a first computational device, and wherein the restoration application executes in a second computational device, and wherein the container class holds all metadata that is to be replicated;

generating data and first metadata, by an executing first application, in the first computational device, wherein the generated data is stored in a first physical storage device coupled to the first computational device, storing the generated first metadata transiently in the first computational device in a ramdisk of the first computational device, wherein the ramdisk is a portion of an internal memory of the first computational device, allocating the ramdisk as a partition, and accessing the ramdisk via a ramdisk device driver, wherein to generate the first metadata the executing first application performs: (a) storing state information of the executing first application in the first metadata, (b) storing messages for communication from the first computational device to another computational device in the first metadata, (c) storing internal memory state of the executing first application in the first metadata, (d) storing intermediate calculated data that transiently stores intermediate values generated by a series of calculations performed by the executing first application in the first metadata, and storing parts of the first metadata in the first computational device transiently and not saving the parts of the first metadata in the first physical storage device;

replicating, by the replication application that executes in the first computational device, the data and at least part of the first metadata to a second physical storage device by:
- (i) copying the data from the first physical storage device to the second physical storage device; and
- (ii) selecting second metadata from the first metadata based on a recovery time objective that defines a period of time in which to recover from any failure of the executing first application on the first computational device, wherein the second metadata is part of the first metadata and smaller in amount than the first metadata, and copying the second metadata from the ramdisk of the first computational device to the second physical storage device by synchronously replicating via the ramdisk device driver all writes to the ramdisk to the second physical storage device, wherein the second physical storage device combines both the data and the second metadata into a single consistency group and the data and the second metadata are replicated in a consistent manner to the second physical storage device; and recovering from a failure of the executing first application within the period of time defined by the recovery time objective by:

(i) restoring, by the restoration application that executes in the second computational device, the replicated second metadata to the second computational device, wherein the second computational device is different from the first computational device;

(ii) allowing a second application that is a copy of the first application that was executing in the first computational device to use the replicated data in the second physical storage device; and (iii) executing the second application at the second computational device from a point of failure of the first application by using the restored second metadata comprising the state information of the executing first application and the replicated data, wherein the second application starts executing within the period of time defined by the recovery time objective.

17. The computer readable storage medium of claim 16, wherein the metadata is not stored in the first physical storage device.

18. The computer readable storage medium of claim 16, wherein a first time period for recovering from the failure is of a lesser duration in a first system that replicates the data and the metadata in comparison to a second time period for recovering from the failure in a second system that replicates the data but not the metadata.

19. The computer readable storage medium of claim 16, wherein the data and the metadata are replicated to the second physical storage device in a consistent manner.

20. The computer readable storage medium of claim 16, wherein:

(i) the first computational device includes: (a) a replication application; and (b) a user application that is the first application; and (ii) the second computational device includes: (a) a restoration application; and (b) a copy of the user application, wherein the copy of the user application is the second application.

* * * * *